United States Patent [19]

Longo

[11] Patent Number: 5,092,823
[45] Date of Patent: Mar. 3, 1992

[54] INTERLOCKING BELT

[75] Inventor: James Longo, Conshohocken, Pa.

[73] Assignee: Karata Enterprises Co., Conshohocken, Pa.

[21] Appl. No.: 595,514

[22] Filed: Oct. 11, 1990

[51] Int. Cl.$^5$ .............................................. F16G 7/00
[52] U.S. Cl. ................................ 474/253; 474/255
[58] Field of Search ............................ 474/253-256

[56] References Cited

U.S. PATENT DOCUMENTS

| | | | |
|---|---|---|---|
| 460,799 | 10/1891 | Kelly . | |
| 595,510 | 12/1897 | Adams . | |
| 663,967 | 12/1900 | Hubbell . | |
| 1,303,687 | 5/1919 | Leffler . | |
| 2,461,859 | 11/1947 | Vasselli | 24/38 |
| 2,799,177 | 12/1955 | Henson | 474/255 |
| 3,310,161 | 3/1965 | Kraft, Jr. | 198/193 |
| 3,324,991 | 8/1965 | Voss | 198/193 |
| 3,414,123 | 1/1966 | Litt et al. | 206/56 |
| 3,485,707 | 5/1966 | Spicer | 161/78 |
| 3,664,490 | 5/1972 | Maruyama | 474/255 |
| 3,744,095 | 7/1973 | Tomlinson | 474/255 |
| 3,748,699 | 7/1973 | Cunningham | 24/38 |
| 4,298,343 | 11/1981 | Redmond | 474/255 |
| 4,506,429 | 3/1985 | Gutschmit | 29/450 |
| 4,705,495 | 11/1987 | Madion | 474/255 |
| 4,846,770 | 7/1989 | Lane | 474/253 |

FOREIGN PATENT DOCUMENTS 141991 12/1901 Fed. Rep. of Germany .
1543565 4/1979 United Kingdom .

Primary Examiner—Ramon S. Britts
Assistant Examiner—Roger J. Schoeppel
Attorney, Agent, or Firm—Panitch Schwarze Jacobs & Nadel

[57] ABSTRACT

An interlocking belt having an elongated female member and an elongated male member extending from it ends. The male and female members extend generally parallel to the lateral edges of the belt and include interlocking complementary dovetail-like projections and notches. A pair of pins extend through the ends of the male and female members for ensuring that the male and female members do not separate as they travel around a pulley. The geometry of the male and female members is such that longitudinal forces extending between the female and male members are borne by the dovetail-like projections and notches and not the pins.

8 Claims, 2 Drawing Sheets

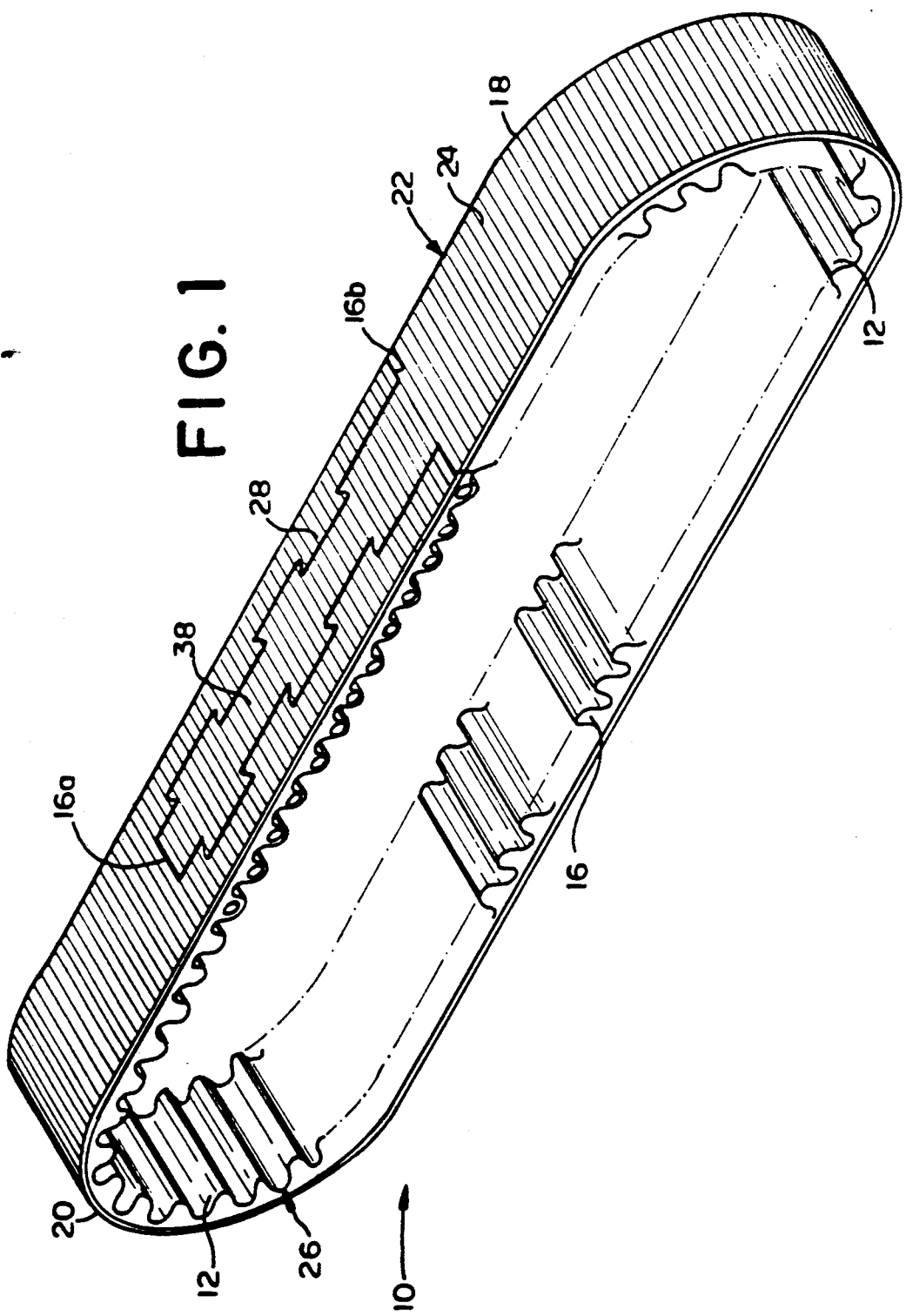

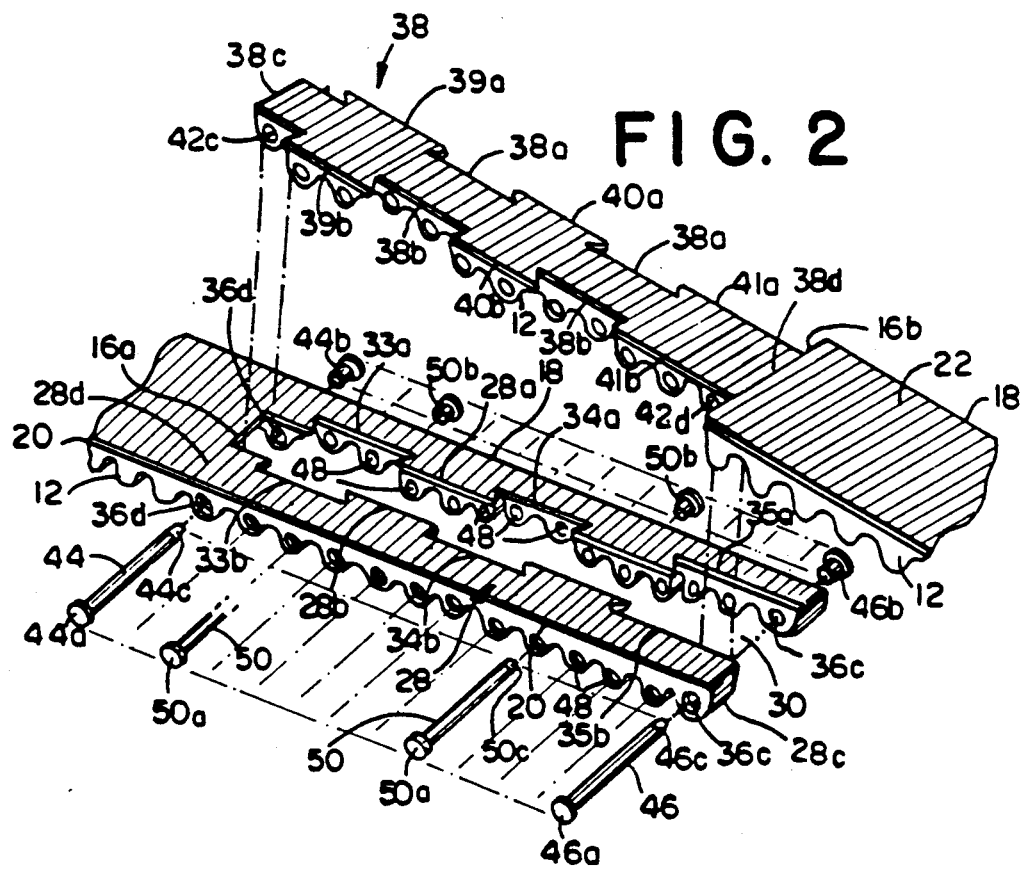
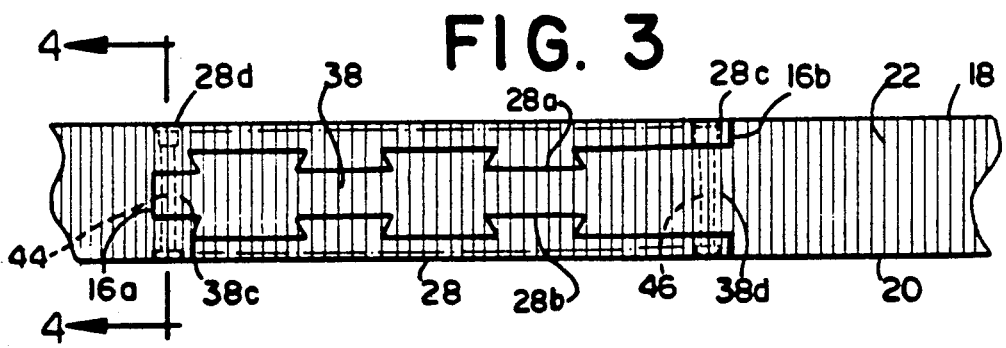
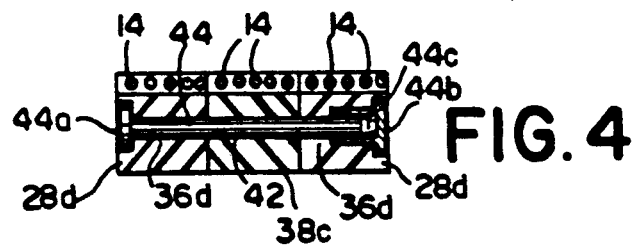

INTERLOCKING BELT

FIELD OF THE INVENTION

The present invention relates to belt splicing and, more particularly to a mechanical splice formed at contiguous belt ends having complementary projections and notches for maximizing the strength at the splice.

BACKGROUND OF THE INVENTION

Tooth drive belts and V-belts for motor vehicles are well known. Like other elements of a motor vehicle, belt failure can occur without warning and at inconvenient times and places. Usually replacements for failed belts are available at motor vehicle fuel-service stations, garages, etc. However, where a belt has failed without warning, service facilities may be closed or a long distance away. Even if a service station or other source is reasonably close and open, it may be out of the belt size needed. Without a proper belt to reestablish reliable motive power, the vehicle is useless unless an emergency repair can be made.

A spare endless belt could be carried in the motor vehicle. However, it is then necessary to also carry the proper tools to install the spare belt. The installation of such a belt may require an excessive amount of time because the corresponding drive pulleys or sprockets may not be readily adjustable to receive the spare belt.

In an attempt to resolve this installation problem, interlocking belts were developed. Typically, an interlocking belt can form an endless belt by joining belt ends with a mechanical splice. Usually, a fastener, such as pins or rivets, is used in connecting the ends of the belt. That is, a male belt tongue interfits with a female U-portion so that the belt-teeth of the male belt tongue are aligned with the belt-teeth of the female U-portion. Holes are molded through the aligned belt-teeth (i.e., laterally of the belt) and pins are inserted in the holes for retaining the belts together. In such splices, the pins are responsible for transferring all the forces between the ends of the belt. Often, after a short period of time the pins fatigue and the splice fails. As such, these belts are only a temporary solution and, therefore, must be replaced with a standard non-interlocking endless belt as soon as possible.

Other attempts to develop belt splices include the use of interengaging transversely extending slots in one belt end and a tongue member having projecting "blades" which are received in the transversely extending slots, thus connecting the two slotted ends. This type of belt splice is problematic, inter alia, in its complexity which increases the overall cost of producing the same.

The use of interlocking teeth at the belt ends is also a known method of connecting belt ends. However, while belt splices which utilize interlocking teeth are adequate in interconnecting the ends of the belt as the splice travels between the pulleys or sprockets, they are problematic because that the belt ends may separate as they travel around a pulley.

The present invention overcomes many of the disadvantages inherent in the above-described belt splices by providing a belt splice wherein the ends of the belt have interlocking dovetail-like projections and notches which are pinned together to prevent the same from uncoupling as the belt travels around the pulleys or sprockets. The dovetail-like projections and notches transfer all the forces between the belt ends and interconnect the same without fatiguing the pins in a relatively short period of time. As such, the interlocking geometry of the present invention yields a belt splice which is stronger and more durable than the belt splices of the prior art. Consequently, use of the present invention results in considerable savings in money as well as time.

SUMMARY OF THE INVENTION

Briefly stated, the present invention is an interlocking belt comprising a flexible body portion having a first end and a second end. An elongate female member extends from the first end of the flexible body portion for being engaged with the second end of the flexible body portion. The female member has a first inside edge, a second inside edge, a distal end and a proximal end. The first and second inside edges extend generally parallel to each other and are spaced apart a first predetermined distance to provide a gap therebetween. The first and second inside edges each include a dovetail-like notch. The proximal and distal ends of the female member each have an aperture extending therethrough. An elongate male member extends from the second end of the flexible body portion for being engaged with the first end of the flexible body portion. The male member has a first side edge, a second side edge, a distal end and a proximal end. The first and second side edges extend generally parallel to each other and are spaced apart a second predetermined distance. The first predetermined distance is approximately equal to the second predetermined distance. The first and second side edges each include a dovetail-like projection extending therefrom The proximal and distal ends of the male member each have an aperture extending therethrough. The male member is complimentarily positioned within the gap of the female member with the dovetail-like projections being complimentarily positioned within the dovetail-like notches and with the aperture in the proximal end of the male member aligned with the aperture in the distal end of the female member and the aperture in the distal end of the male member aligned with the aperture in the proximal end of the female member. A first pin extends through the aperture in the proximal end of the male member and the aperture in the distal end of the female member for connecting the proximal end of the male member to the distal end of the female member. A second pin extends through the aperture in the distal end of the male member and the aperture in the proximal end of the female member for connecting the distal end of the male member to the proximal end of the female member whereby the female member is securely interlocked to the male member to thereby form an endless belt.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that this invention is not limited to the specific methods and instrumentalities disclosed. In the drawings:

FIG. 1 is a perspective view of an interlocking belt in accordance with the present invention;

FIG. 2 is a partial exploded perspective view of FIG. 1 showing the belt splice portion of the interlocking belt;

FIG. 3 is a partial to plan view of FIG. 1 showing the belt splice portion of the interlocking belt; and FIG. 4 is an enlarged cross-sectional view of the belt splice of FIG. 3 taken along line 4—4 of FIG. 3.

DESCRIPTION OF PREFERRED EMBODIMENT

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the interlocking belt and designated parts thereof. The terminology includes the words above specifically mentioned, derivatives thereof and words of similar import.

Referring to the drawings, wherein like numerals indicate like elements throughout, there is shown in FIG. 1, a perspective view of an interlocking belt, generally designated 10, having a splice in accordance with the present invention In the present embodiment, it is preferred that the belt 10 be of the tooth power transmission type. That is, the belt has teeth 12 running transversely along the interior surface of the belt 10 for receiving a sprocket (not shown) or the like.

As shown in FIG. 4, the belt 10 is preferably constructed of a polymeric material, such as polyurethane, and includes a plurality reinforcing cords 14 extending longitudinally throughout the length of the belt. In the present embodiment, it is preferred that the reinforcing cords 14 be constructed of KEVLAR and the teeth 12 be encased in a protective jacket (not shown) to promote the durability of the belt, as is understood by those skilled in the art.

It is understood by those skilled in the art, that the present invention is not limited to any particular type of belt. That is, the present invention is not limited to the specific type, material or size of the belt. For instance, the belt could have any number of teeth, be of any width and have any length for accommodating different distances between pulleys or sprockets. Furthermore, the belt 10 and reinforcing cords 14 can be constructed of other suitable materials, such as neoprene and fiberglass, respectively, without departing from the spirit and scope of the invention. Where the belt 10 is constructed of neoprene and fiberglass, the teeth 12 can be encased in a protective nylon jacket to promote the durability of the belt. Moreover, the present invention is not limited to a belt having teeth and is equally applicable to a V-type belt.

Referring now to FIG. 1, the belt 10 includes a flexible body portion 16 having a first end 16a and a second end 16b. The body portion 16 has a width defined by the lateral edges 18, 20 of the belt 10. The body portion 16 further includes an exterior surface 22 having a series of equidistantly spaced transversely extending grooves 24 for providing the belt 10 with flexibility. However, it is understood by those skilled in the art, that the exterior surface 22 can be generally flat. Similarly, as mentioned previously, the body portion 16 includes an interior surface 26 which is comprised of the teeth 12.

Referring now to FIGS. 2 and 3, an elongated female member 28 extends from the first end 16a of the body portion 16 for being engaged with the second end 16b of the body portion 16. The female member 28 has a first inside edge 28a, a second inside edge 28b, a distal end 28c and a proximal end 28d. As best shown in FIG. 3, the first and second inside edges 28a, 28b extend generally parallel to each other and to, the lateral edges 18, 20 of the body portion 16 and are spaced apart a first predetermined distance to provide a gap 30 therebetween. The first and second inside edges 28a, 28b are preferably space inwardly from the lateral edges 18, 20 of the body portion 16. The exterior and interior surfaces of the female member 28 are preferably formed generally identical to the exterior and interior surfaces 22, 26 of the body portion 16.

As shown in FIG. 3, the first and second inside edges 28a, 28b each include first and second dovetail-like notches 33a, 33b, 34a, 34b and lug notches 35a, 35b, respectively, each extending toward the lateral edges 18, 20 of the female member 28. In the present embodiment, it is preferred that the first dovetail-like notches 33a, 33b be positioned adjacent to each other at the same general distance from the proximal end 28d of the female member 28. Similarly, it is preferred that the second dovetail-like notches 34a, 34b and the lug notches 35a, 35b be positioned adjacent each other, respectively, at the same general distance from the proximal end 28d of the female member 28. It is preferred that the first dovetail-like notches 33a, 33b be positioned closest to the proximal end 28d of the female member 28 and that the lug notches 35a, 35b be positioned furthest from the proximal end 28d of the female member 28 with the second dovetail-like notches 34a, 34b equidistantly positioned therebetween. However, it is understood by those skilled in the art, that the first and second dovetail-like notches 33a, 33b, 34a, 34b and the lug notches 35a, 35b could be positioned in a staggered manner or at unequal distances along the length of the female member 28, without departing from the spirit and scope of the invention.

As shown in FIG. 2, the distal and proximal ends 28c, 28d of the female member 28 each have an aperture 36c, 36d, respectively, extending therethrough. In the present embodiment, it is preferred that the apertures 36c, 36d extend through the body of one of the teeth 12 located proximate the distal and proximal ends 28c, 28d of the female member 28. The apertures 36c, 36d are preferably countersunk at the lateral edges 18, 20 of the female member 28 for reasons described hereinafter.

Referring now to FIG. 2, an elongate male member 38 extends from the second end 16b of the body portion 16 for being engaged with the first end 16a of the body portion 16. The male member 38 has a first side edge 38a, a second side edge 38b, a distal end 38c and a proximal end 38d. The first and second side edges 38a, 38b extend generally parallel with respect to each other and the lateral edges 18, 20 of the body portion 16 and are spaced apart a second predetermined distance. In the present embodiment, it is preferred that the first predetermined distance be approximately equal to the second predetermined distance. The exterior and interior surfaces of the male member 38 are preferably formed generally identical to the exterior and interior surfaces 22, 26 of the body portion 16.

The first and second side edges 38a, 38b each include first and second dovetail-like projections 39a, 39b, 40a, 40b and lug projections 41a, 41b, respectively, each extending laterally there from. The first dovetail-like projections 39a, 39b are preferably positioned adjacent to each other at the same general distance from the distal end 38c of the male member 38. Similarly, it is preferred that the second dovetail-like projections 40a, 40b and lug projections 41a, 41b also be respectively positioned adjacent each other at the same distance from the distal end 38c of the male member 38. In the present embodiment, it is preferred that the first dovetail-like projections 39a, 39b be positioned closest to the distal end 38c of the male member 38 and the lug projections 41a, 41b be positioned farthest from the distal end 38c of the male member 38 with the second dovetail-like projections 40a, 40b being equidistantly positioned therebetween. However, it is understood by those skilled in the art, that the first and second dovetail-like projections 39a, 39b, 40a, 40b and the lug projections 41a, 41b could be positioned in a staggered manner or at unequal distances along the length of the male member 38, without departing from the spirit and scope of the invention.

In the present embodiment, it is preferred that the lug notches 35a, 35b have a depth which corresponds to the depth of the first and second dovetail-like notches 33a, 33b, 34a, 34b and that the lug notches 35a, 35b extend to the distal end 28c of the female member 28. It is further preferred that the lug notches 35a, 35b be shaped generally in the form of one-half of a dovetail. The lug projections 41a, 41b are preferably correspondingly shaped for being positioned within the lug notches 35a, 35b.

As shown in FIG. 2, the distal and proximal ends 38c, 38d of the male member 38 each have an aperture 42c, 42d, respectively, extending therethrough, as described in more detail hereinafter. In the present embodiment, it is preferred that the apertures 42c, 42d extend through the body of one of the teeth 12 located proximate the distal and proximal ends 38c, 38d of the male member 38.

The female and male members 28, 38 preferably extend generally the same distance from the first and second ends 16a, 16b, respectively, of the body portion 16. Additionally, the notches 33a, 33b, 34a, 34b, 35a, 35b are preferably equidistantly spaced along the length of the female member 28. Similarly, the projections 39a, 39b, 40a, 40b, 41a, 41b are preferably equidistantly spaced along the male member 38 in a manner which complements the spacing of the notches 33a, 33b, 34a, 34b, 35a, 35b on the female member 28. Further, it is preferred that the notches 33a, 33b, 34a, 34b, 35a, 35b and the projections 39a, 39b, 40a, 40b, 41a, 41b be complimentarily sized for allowing the first and second dovetail-like projections 39a, 39b, 40a, 40b and the lug projections 41a, 41b to be positioned within the first an second dovetail-like notches 33a, 33b, 40a, 40b and the lug notches 41a, 41b, respectively.

As shown in FIGS. 1 and 3, due to the above-described relationship, when the belt 10 is interlocked, the male member 38 is complimentarily positioned within the gap 30 of the female member 28 with the projections 39a, 39b, 40a, 40b, 41a, 41b complimentarily positioned within the notches 33a, 33b, 34a, 34b, 35a, 35b, respectively, such that the teeth 12 on the interior surfaces of the female and male members 28, 38 are aligned. When the male member 38 is positioned within the gap 30 of the female member 28, the first and second ends 16a, 16b of the body portion 16 are securely interlocked to form an endless belt due to the above-described geometrical configurations of the male and female members 38, 28.

Referring now to FIG. 3, when the male member 38 is complimentarily positioned within the gap 30 of the female member 28, the aperture 42d in the proximal end 38d of the male member 38 is aligned with the aperture 36c in the distal end 28c of the female member 28 and the aperture 42c in the distal end 38c of the male member 38 is generally aligned with the aperture 36d in the proximal end 28d of the female member 28.

Referring now to FIGS. 2 and 4, a first pin 44 extends through the aperture 42c in the distal end 38c of the male member 38 and the aperture 36d in the proximal end 28d of the female member 28 for connecting the distal end 38c of the male member 38 to the proximal end 28d of the female member 28. More particularly, the first pin 44 has a length which is approximately equal to the width of the belt 10. The first pin 44 includes a head 44a and a cap 44b for frictionally receiving the end 44c of the first pin 44, as shown in FIG. 4. The apertures 36c, 36d in the distal and proximal ends 28c, 28d of the female member 28 are preferably countersunk at the lateral edges thereof for receiving the head 44a and cap 44b. Countersinking the apertures 36 prevents the head 44a and cap 44b from interfering from the movement of the belt 10 along the pulley or drive system (not shown).

As shown in FIGS. 2 and 3, a second pin 46 extends through the aperture 42d in the proximal end 38d of the male member 38 and the aperture 36c in the distal end 28c of the female member 28 for connecting the proximal end 38d of the male member 38 and the distal end 28c of the female member 28. The second pin 46 is generally identical to the first pin 44 and includes a head 46a and a cap 46b for frictionally receiving the end 46c of the second pin 46.

In the present embodiment, it is preferred that the first pin 44 and the second pin 46 be constructed of a high strength metallic material, such as steel. However, it is understood by those skilled in the art, that other materials can be used to construct the first and second pins 44, 46, such as brass or a polymeric material. Furthermore, it is understood by those skilled in the art, that the present invention is not limited to any specific type of fastener for interconnecting the ends of the male and female members 38, 28. For instance, the apertures 36c, 36d, 42c, 42d could be threaded for threadably receiving a threaded fastener (i.e., screw) without departing from the spirit and scope of the invention.

In the present embodiment, the first and second pins 44, 46 do not have to withstand large forces which extend longitudinally of the belt 10 because the projections 39a, 39b, 40a, 40b, 41a, 41b and notches 33a, 33b, 34a, 34b, 35a, 35b provide the necessary interlocking structure for accommodating these forces. As such, the belt 10 is durable because the first and second pins 44, 46 do not have to withstand large longitudinally extending forces.

The first and second pins 44, 46 serve the function of ensuring that the respective proximal and distal ends 28d, 38d, 28c, 38c of the female and male members 28, 38 do not separate as they travel around a pulley or the like. That is, as the female and male members 28, 38 travel around a pulley or sprocket, the distal end 38c of the male member 38 tends to lift upwardly away from the proximal end 28c of the female member 28. The first pin 44 prevents the same from occurring. Similarly, as the female and male members 28, 38 travel around a pulley or sprocket, the proximal end 28c of the female member 28 tends to lift upwardly and away from the distal end 38c of the male member 38. The use of the second pin 46 prevents distal end 28c of the female member 28 from separating from the proximal end 38c of the male member 38.

While in the present embodiment, it is preferred that the female and male members 28, 38 be secured together by the first and second pins 44, 46, it is understood by those skilled in the art, that any number of pins may extend along the length of the female and male members 28, 38. For instance, as shown in FIG. 2, each of the teeth 12 in the female and member members 28, 38 includes an aperture for receiving a complementary pin 50 (schematically shown) therethrough for the reasons stated above. Each pin 50 includes a head 50a and a cap 50b for frictionally receiving the end 50c of the pin 50. The use of a plurality of pins 50 further ensures that the female and male members 28, 38 do not separate as they travel around a pulley or sprocket.

Further, the use of a plurality of pins 50 and apertures 48 allow the overall length of the belt 10 to be adjusted to readily accommodate different size pulleys and sprockets as well as differences in distance therebetween. For instance, the overall length of the belt 10 can be increased by complimentarily positioning the first and second dovetail-like projections 39a, 39b, 40a, 40b within the second dovetail-like notches 34a, 34b and lug notches 35a, 36b, respectively. The pins 50 can then be positioned within the apertures 48 to connect the male and female members 38, 28 together. Similarly, the overall length of the belt 10 can be decreased by appropriately cutting the lug notches 35a, 35b off the distal end 28c of the female member 28 and trimming the first and second inside edges 28a, 28b between the second dovetail-like notches 34a, 34b and the lug notches 35a, 35b to the depth of the second dovetail-like notches 34a, 34b as well as cutting the first dovetail-like projections 39a, 39b off the distal end 38c of the male member 38. The second dovetail-like projections 40a, 40b and lug projections 41a, 41b are then complimentarily positioned within the first and second dovetail-like notches 33a, 33b, 34a, 34b, respectively to thereby yield a belt 10 of shorter length. The pins 50 can then be positioned within the apertures 48 to connect the female and male members 28, 38. Of course, it is understood by those skilled in the art, that the overall length of the belt 10 can be increased or decreased by splicing the male and female members 38, 28 in other combinations.

In the present embodiment, it is preferred that the belt 10 be formed of the materials described above by a molding process, such as injection molding. However, it is understood by those skilled in the art, that other processes can be used to manufacture the interlocking belt 10, such as die cast molding. Furthermore, it is preferred that the female and male members 28, 38 be formed by punching or stamping the outline shown in FIG. 3 with a die. Further, the apertures 36c, 36d, 42c, 42d and 48 in the female and male members 28, 38 are preferably formed during the molding process. However, it is understood by those skilled in the art, that the apertures could be drilled after the molding process.

While it is preferred that the interlocking belt 10 in accordance with the present invention include first and second dovetail-like notches and lug notches 33a, 33b, 34a, 34b, 35a, 35b and first and second dovetail-like projections and lug projections 39a, 39b, 40a, 40b, 41a, 41b, it is understood by those skilled in the art, that any number of dovetail-like projections and notches can extend along the first and second side edges 38a, 38b and first and second inside edges 28a, 28b, respectively, without departing from the spirit and scope of the invention so long as the first and second side edges 38a, 38b and first and second inside edges 28a, 28b extend generally parallel with respect to each other and the lateral edges 18, 20 of the body portion 16. This ensures that the longitudinal forces extending through the splice are absorbed by the interlocking geometry and not the pins 44, 46 and 50. It is understood by those skilled in the art, that two or more belts 10 can be connected together end to end to increase the overall length of the belt.

To assemble and install the interlocking belt 10, the teeth 12 of the body portion 16 are placed in engagement with a pair of corresponding pulleys (not shown) with the first and second ends 16a, 16b positioned therebetween. The male member 38 is then complimentarily positioned within the gap 30 of the female member 28 with the first and second dovetail-like projections 39a, 39b, 40a, 40b, complimentarily positioned within the first and second dovetail-like notches 33a, 33b, 34a, 34b and the lug projections 41a, 41b complimentarily positioned within the lug notches 35a, 35b. As mentioned above, when the male and female members 38, 28 are interlocked, the apertures 36c, 36d, 42c, 42d are aligned for receiving the first and second pins 44, 46. The first pin 44 is then positioned through the aperture 36d in the proximal end 28d of the female member 28 and through the aperture 42c in the distal end 38c of the male member 38 until the first pin head 44a is located in the countersunk portion of the aperture 36d. The cap 44b is then positioned over the end 44c of the first pin 44 and a crimping tool (e.g., a pair of pliers or the like) is used to frictionally mount the cap 44b on the end of the first pin 44c as is understood by those skilled in the art. The same general procedure is then followed with the respect to the second pin 46, and the other pins 50, if desired, whereby the female member 28 is securely interlocked to the male member 38 to thereby form an endless belt.

The above assembly and installation of the interlocking belt 10 is accomplished without having to adjust the distance between the pulleys (not shown) as in the standard non-interlocking endless belts. The necessity of carrying a complete set of tools is avoided since a crimping tool (e.g., a pair of pliers or the like) is all that is required to install the belt 10. Thus, the interlocking belt 10 of the present invention yields a belt splice which is easily installed and which is stronger and more durable than the belt splices available before the present invention.

From the foregoing description, it can be seen that the present invention comprises a belt having interlocking male and female ends. It will be appreciated by those skilled in the art, that changes could be made to the embodiment described above without departing from the broad inventive concept thereof. It is understood, therefore, that this invention is not limited to the particular embodiment disclosed, but it is intended to cover all modifications which are within the spirit and scope of the invention as defined by the appended claims.

I claim:

1. An interlocking belt comprising:
    a flexible body portion having a first end and a second end;
    an elongated female member extending from said first end of said flexible body portion for being engaged with said second end of said flexible body portion, said female member having a first inside edge, a second inside edge, a distal end and a proximal end, said first and second inside edges extending generally parallel to each other and being spaced apart a first predetermined distance to provide a gap therebetween, said first and second inside edges each including a dovetail-like notch, said proximal and distal ends of said female member each having an aperture extending therethrough;

an elongate male member extending from said second end of said flexible body portion for being engaged with said first end of said flexible body portion, said male member having a first side edge, a second side edge, a distal end and a proximal end, said first and second side edges extending generally parallel to each other and being spaced apart a second predetermined distance, said first predetermined distance being approximately equal to said second predetermined distance, said first and second side edges each including a dovetail-like projection extending therefrom, said proximal and distal ends of said male member each having an aperture extending therethrough, said male member being complimentarily positioned within said gap of said female member with said dovetail-like projections being complimentarily positioned within said dovetail-like notches and with said aperture in said proximal end of said male member being aligned with said aperture in said distal end of said female member and said aperture in said distal end of said male member being aligned with said aperture in said proximal end of said female member;

a first pin extending through said aperture in said proximal end of said male member and said aperture in said distal end of said female member for connecting said proximal end of said male member to said distal end of said female member; and a second pin extending through said aperture in said distal end of said male member and said aperture in said proximal end of said female member for connecting said distal end of said male member to said proximal end of said female member whereby said female member is securely interlocked to said male member to thereby form an endless belt.

2. The interlocking belt as recited in claim 1, further including second dovetail-like projections extending outwardly from said first and second side edges of said male member and second dovetail-like notches in said first and second inside edges of said female member, said second dovetail-like projections of said male member being complimentarily positioned within said second dovetail-like notches.

3. The interlocking belt as recited in claim 2, further including lug projections extending outwardly from said first and second side edges of said male member and lug notches in said first and second inside edges of said female member, said lug projections of said male member being complimentarily positioned within said lug notches.

4. The interlocking belt as recited in claim 1, further including lug projections extending outwardly from said first and second side edges of said male member and lug notches in said first and second inside edges of said female member, said lug projections of said male member being complimentarily positioned within said lug notches.

5. An interlocking belt comprising:

a flexible body portion having a first end and a second end;

an elongated female member extending from said first end of said flexible body portion for being engaged with said second end of said flexible body portion, said female member having a first inside edge, a second inside edge, a distal end and a proximal end, said first and second inside edges extending generally parallel to each other and being spaced apart a first predetermined distance to provide a gap therebetween, said first and second side edges each including a dovetail-like notch, said proximal and distal ends of said female member each having an aperture extending therethrough;

an elongate male member extending from said second end of said flexible body portion for being engaged with said first end of said flexible body portion, said male member having a first side edge, a second side edge, a distal end and a proximal end, said first and second side edges extending generally parallel to each other and being spaced apart a second predetermined distance, said first predetermined distance being approximately equal to said second predetermined distance, said first and second side edges each including a dovetail-like projection extending therefrom, said proximal and distal ends of said male member each having an aperture extending therethrough, said male member being complimentarily sized for being positioned within said gap of said female member with said dovetail-like projections complimentarily positioned within said dovetail-like notches and with said aperture in said proximal end of said male member being aligned with said aperture in said distal end of said female member and said aperture in said distal end of said male member being aligned with said aperture in said proximal end of said female member;

a first pin for being positioned through said aperture in said proximal end of said male member and said aperture and said distal end of said female member for connecting said proximal end of said male member to said distal end of said female member; and a second pin for being positioned through said aperture in said distal end of said male member and said aperture in said proximal end of said female member for connecting said distal end of said male member to said proximal end of said female member, whereby when said male member is complimentarily positioned within said gap of said female member with said dovetail-like projections complimentarily positioned within said dovetail-like notches, said female member is securely interlocked to said male member to thereby form an endless belt.

6. The interlocking belt as recited in claim 5, further including second dovetail-like projections extending outwardly from said first and second side edges of said male member and second dovetail-like notches in said first and second inside edges of said female member for complimentarily receiving said second dovetail-like projections of said male member.

7. The interlocking belt as recited in claim 6, further including lug projections extending outwardly from said first and second side edges of said male member and lug notches in said first and second side edges of said female member for complimentarily receiving said lug projections of said male member.

8. The interlocking belt as recited in claim 5, further including lug projections extending outwardly from said first and second side edges of said male member and lug notches in said first and second side edges of said female member for complimentarily receiving said lug projections of said male member.

* * * * *